United States Patent [19]
Yamada et al.

[11] 3,875,095
[45] Apr. 1, 1975

[54] HOT MELT COMPOSITIONS COMPRISING ELVA AND A HYDROCARBON COPOLYMER

[75] Inventors: Koichi Yamada; Hiromi Ueki; Koichiro Masuda, all of Yamaguchi; Katsuhiko Tasaka, Tokyo, all of Japan

[73] Assignee: Mitsui Petrochemical Industries, Ltd., Tokyo, Japan

[22] Filed: Apr. 11, 1974

[21] Appl. No.: 459,989

[30] Foreign Application Priority Data
Apr. 11, 1973  Japan.............................. 48-40359

[52] U.S. Cl.. 260/28.5 AV, 156/334, 260/28.5 AV, 260/82, 260/889, 260/897 B
[51] Int. Cl. ............................................. C08f 37/18
[58] Field of Search............... 260/897, 82, 28.5 AV

[56] References Cited
UNITED STATES PATENTS

| | | | |
|---|---|---|---|
| 3,245,931 | 4/1966 | Matthew............................ | 260/28.5 |
| 3,401,132 | 9/1968 | Eihl et al. ........................... | 260/28.5 |
| 3,644,252 | 2/1972 | Shenfeld et al. .................. | 260/27 R |

*Primary Examiner*—Murray Tillman
*Assistant Examiner*—C. J. Seccuro
*Attorney, Agent, or Firm*—Sughrue, Rothwell, Mion, Zinn & Macpeak

[57] ABSTRACT

A hot melt composition having improved properties comprising a blend of an ethylene-vinyl acetate copolymer and a resin prepared by copolymerizing vinyl aromatic hydrocarbons containing isopropenyltoluene and a by-product fraction obtained in refining or cracking petroleum.

14 Claims, No Drawings

HOT MELT COMPOSITIONS COMPRISING ELVA AND A HYDROCARBON COPOLYMER

BACKGROUND OF THE INVENTION

1. Field of the Invention

The present invention relates to a novel hot melt composition comprising an ethylene-vinyl acetate copolymer as the base resin and, more particularly, it relates to a novel hot melt composition comprising an ethylene-vinyl acetate copolymer and an excellent tackifier.

2. Description of the Prior Art

The demand for hot melt used as adhesives and coating agents has recently increased rapidly in the fields of bookbinding, canning, bag making, woodworking, laminating, sealing, coating, etc., due to advantages in working and properties. As such a hot melt, generally blends of an ethylene-vinyl acetate copolymer as a base resin with a tackifier and a wax are used. As a tackifier for the purpose, a rosinic resin has been ordinarily used from the standpoint of compatibility with wax, adhesive properties, melt viscosity, flexibility, etc., but since the supply of such a rosinic resin is unstable, an odor is generated on working the rosinic resin, and further the rosinic resin is inferior in thermal stability, light stability, hue, etc., an attempt has been made to employ synthetic materials instead of a rosinic resin. As synthetic resins for such a purpose, low molecular weight polystyrene, an α-methylstyrene-vinyltoluene copolymer, a styrene-olefin copolymer, and an aromatic or aliphatic petroleum resin have been proposed but since they have large disadvantages, their uses are limited in each case. That is, copolymer resins mainly comprising styrene, vinyltoluene, α-methylstyrene, etc., have a fatal defect in that they are inferior in compatibility with a base material and the aliphatic or aromatic petroleum resins have difficulties from the standpoint of odor, color, and thermal stability in addition to compatibility. Also, while the petroleum resin prepared from a mixed fraction of aliphatics and aromatics may exhibit good compatibility with a base resin, it is inferior in color and thermal stability and further when such a resin is prepared by a specific method, e.g., by hydrogenating a mixed fraction of aliphatics and aromatics in an aliphatic hydrocarbon solvent in the presence of a catalyst, e.g., a nickel catalyst, at a temperature ranging from about 150° to 250°C under a pressure ranging from about 30 to 250kg/cm² to reduce the odor, or by condensing a resin at a high temperature under a high vacuum for a long period of time and then removing the low molecular weight materials to reduce the odor, the resin is still inferior in odor. To improve these defects, copolymers of an aliphatic fraction and aromatic vinyl compounds such as styrene, vinyltoluene, α-methylstyrene, etc., have been proposed but such copolymers also have poor compatibility with the base resin. As mentioned above, synthetic materials having good adhesive properties as well as the desired compatibility with a base resin, thermal stability, color, and odor have not yet been found as far as simple and easily available raw materials are concerned.

SUMMARY OF THE INVENTION

On the other hand, the inventors have discovered that a resin prepared using isopropenyltoluene which is similar to styrene, vinyltoluene, α-methylstyrene, etc., and is considered to act as these monomers unexpectedly has excellent properties as a tackifier and based on this discovery, have succeeded in attaining the hot melt composition of this invention.

That is, the present invention provides a hot melt composition comprising a mixture of a resin (C) prepared by copolymerizing 100 parts by weight of vinyl aromatic hydrocarbons (A) containing more than about 25% by weight isopropenyltoluene and about 5 to 250 parts by weight of a by-product fraction obtained in refining or cracking petroleum and having 4 to 5 carbon atoms, the proportion of the isopropenyltoluene in the total amount of the hydrocarbons (A) and the fraction (B) being more than 20% by weight, in the presence of a Friedel-Crafts catalyst and an ethylene-vinyl acetate copolymer (D) containing about 15 to 40% by weight vinyl acetate.

DETAILED DESCRIPTION OF THE INVENTION

Isopropenyltoluene is easily available from the dehydrogenation reaction of cymene, in which cymene

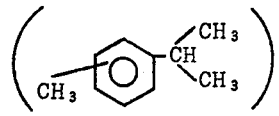

is dehydrated in the presence of a catalyst such as a metal oxide, for example, $Cr_2O_3$, $Fe_2O_3$, ZnO, etc., or alumina. The method and the conditions employed are disclosed in Japanese Pat. publication No. 2373/1957. Isopropenyltoluene is also readily available as by-product in the production of cresol by a cymene process as disclosed in U.S. Pat. No. 2,628,983 or by dehydration of tolyldimethyl carbinol. The o-isomer, m-isomer, and p-isomer of isopropenyltoluene can be used but a mixture of the isomers containing more than 40% of the m-isomer is preferable.

In the present invention, isopropenyltoluene alone can be used as the vinyl aromatic hydrocarbon (A) described above but a mixture containing isopropenyltoluene together with another vinylic aromatic monomer or monomers having 8 to 12 carbon atoms such as styrene, vinyltoluene, α-methylstyrene, tert-butylstyrene 2,6-dimethylstyrene, 2,4-dimethylstyrene, ethylstyrene, β-methylstyrene, etc., can be used if the mixture contains more than about 25% by weight isopropenyltoluene. When such a mixture is employed, it is preferable that the total content of isopropenyltoluene and α-methylstyrene in the mixture be more than about 40% by weight of the mixture.

The by-product fraction produced in refining or cracking petroleum and having 4 to 5 carbon atoms (hereinafter, for brevity such a fraction is designated a "$C_4$–$C_5$ fraction") is a fraction having a boiling point ranging from about −15°C to 45°C at normal pressure and contains polymerizable monomers such as 1-butene, 2-butene, isobutene, butadiene, 1-pentene, 2-pentene, cyclopentene, 1,3-pentadiene, isoprene, cyclopentadiene, 2-methyl-1-butene, 2-methyl-2-butene, 3-methyl-1-butene, etc. The composition of the $C_4$–$C_5$ fraction generally is as follows:

| Component | % by weight |
| --- | --- |
| $C_4$–$C_5$ Olefins | 25 to 75 |
| $C_4$-Olefins | 20 to 50 |

-Continued

| Component | % by weight |
|---|---|
| C$_5$-Olefins | 5 to 25 |
| C$_4$-C$_5$ Diolefins | 15 to 60 |
| C$_4$-Diolefins | 10 to 30 |
| C$_5$-Diolefins | 5 to 30 |
| C$_4$-C$_5$ Paraffins | 10 to 35 |
| Others (C$_3$-Hydrocarbons, C$_6$-Hydrocarbons) | 0 to 5 |

Examples of C$_4$ olefins are 1-butene, cis and trans 2-butene, etc. Examples of C$_5$ olefins are 1-pentene, 2-pentene, cyclopentene, 2-methyl-1-butene, 2-methyl-2-butene, 3-methyl-1-butene, etc. Examples of C$_4$ diolefins are butadiene, etc. Examples of C$_5$ diolefins are isoprene, cyclopentadiene, 1,3-pentadiene, etc. Examples of C$_4$-C$_5$ paraffins are n-butane, isobutane, n-pentane, isopentane, etc.

A specific embodiment of the C$_4$-C$_5$ fraction which can be used in the present invention is as follows:

| Component | % by weight |
|---|---|
| C$_4$-Olefins; Butenes (for example, N-butene, cis and trans 2-butene, isobutene, etc.) | 20 to 50 |
| C$_4$-Diolefins; Butadienes | 10 to 30 |
| C$_5$-Olefins | |
| Pentenes | 2 to 10 |
| Cyclopentene | 1 to 3 |
| 2-Methyl-1-Butene | 1 to 7 |
| 2-Methyl-2-Butene | 1 to 5 |
| C$_5$-Diolefins | |
| Isoprene | 2 to 12 |
| Cyclopentadiene | 2 to 10 |
| 1,3-Pentadiene | 1 to 8 |
| C$_4$-C$_5$ Paraffins (for example, n-butane, isobutane, n-pentane, etc.) | 10 to 35 |
| Others (C$_3$ and C$_6$ hydrocarbons) | 0 to 5 |

As the by-product component (B) used in this invention, any desired fractions selected from those C$_4$ to C$_5$ fractions can be employed, for example, not only the C$_4$-C$_5$ fraction but also a C$_4$ fraction, a C$_5$ fraction, a C$_4$ fraction from which butadiene has been removed, a C$_5$ fraction from which isoprene has been removed, and a C$_5$ fraction from which cyclopentadiene has been removed can be used.

A suitable C$_4$-fraction composition is as follows:

| Component | % by weight |
|---|---|
| C$_3$-Hydrocarbons | 0 to 5 |
| Butenes (for example, 1-butene, cis and trans 2-butene, isobutene, etc.) | 35 to 65 |
| 1,3-Butadiene | 30 to 65 |
| C$_4$-Paraffins (for example, n-butane, isobutane, etc.) | 1 to 10 |

The C$_4$-fraction after butadiene removal generally has the following composition:

| Component | % by weight |
|---|---|
| C$_3$-Hydrocarbons | less than 3 |
| 1-Butene | 15 to 35 |
| cis and trans 2-Butene | 5 to 25 |
| Isobutene | 35 to 60 |
| 1,3-Butadiene | less than 2 |
| Isobutane and n-Butane | 3 to 20 |

The C$_5$-fraction generally has the following composition:

| Component | % by weight |
|---|---|
| C$_5$-Olefins | 8 to 48 |
| C$_5$-Diolefins | 10 to 50 |
| C$_5$-Paraffins | 5 to 45 |
| C$_4$ and C$_6$ Hydrocarbons | 0 to 5 |

A specific embodiment of the C$_5$-fraction which can be used in the present invention is as follows:

| Component | % by weight |
|---|---|
| C$_5$-Olefins | |
| Pentenes | 3 to 20 |
| 2-Methyl-1-Butene | 3 to 15 |
| 2-Methyl-2-Butene | 2 to 10 |
| 3-Methyl-1-Butene | 0 to 3 |
| C$_5$-Diolefins | |
| 1,3-Pentadiene (cis and trans) | 4 to 15 |
| Isoprene | 4 to 20 |
| Cyclopentadiene | 2 to 15 |
| C$_5$-Paraffins (for example, n-pentane, isopentane, etc.) | 5 to 50 |
| C$_4$ and C$_6$ Hydrocarbons | 0 to 5 |

The C$_5$-fraction after isoprene removal generally has the following composition:

| Component | % by weight |
|---|---|
| C$_5$-Olefins | |
| Pentenes | 3 to 18 |
| 2-Methyl-1-Butene | 3 to 16 |
| 2-Methyl-2-Butene | 1 to 8 |
| 3-Methyl-1-Butene | 0 to 3 |
| C$_5$-Diolefins | |
| 1,3-Pentadiene (cis and trans) | 5 to 20 |
| Isoprene | 0 to 5 |
| Cyclopentadiene | 1 to 10 |
| C$_5$-Paraffins (for example, n-pentane, isopentane, etc.) | 10 to 50 |
| C$_4$-Hydrocarbons and Others | 2 to 8 |

The C$_5$-fraction after cyclopentadiene removal generally has the following composition:

| Component | % by weight |
|---|---|
| C$_5$-Olefins | |
| Pentenes | 5 to 25 |
| 2-Methyl-1-Butene | 5 to 17 |
| 2-Methyl-2-Butene | 3 to 12 |
| 3-Methyl-1-Butene | 0 to 3 |
| C$_5$-Diolefins | |
| 1,3-Pentadiene | 4 to 15 |
| Isoprene | 6 to 25 |
| Cyclopentadiene | 0 to 3 |
| C$_5$-Paraffins | 15 to 50 |
| C$_4$-Hydrocarbons and Others | 0 to 6 |

A C$_4$-C$_5$ fraction having a boiling point ranging from −15° to 45°C is most preferable in the present invention but the above described fractions are also suitable for use.

The copolymerization ratio of the vinyl aromatic hydrocarbon component (A) and the by-product component (B) is about 5 to 250, preferably 30 to 100, parts by weight of by-product component (B) to 100 parts by weight of vinyl aromatic hydrocarbon component (A). In this case, however, it is important that the mixture of the components (A) and (B) contain more than about 20% by weight isopropenyltoluene.

The copolymerization of the vinyl aromatic hydrocarbon component (A) and the by-product component (B) is usually conducted at temperature of −50°C to 80°C, preferably −20° to 10°C, in the presence of a Friedel-Crafts catalyst such as aluminum trichloride, aluminum tribromide, monoethyldichloro aluminum, titanium tetrachloride, tin tetrachloride, ferric chloride, boron trifluoride, and various complex compounds of boron trifluoride such as boron trifluoride-phenol complex and boron trifluoride-ethanol complex with boron trifluoride phenol complex being preferred. The copolymerization can be conducted in the absence or presence of an appropriate solvent.

Suitable solvents which can be used in the present invention are aliphatic hydrocarbon solvents, aromatic hydrocarbon solvents and alicyclic hydrocarbon solvents. Suitable examples of aliphatic hydrocarbon solvents are $C_5$ to $C_{16}$ aliphatic hydrocarbons such as pentane, hexane, heptane, octane, nonane, decane, etc. Further, suitable examples of aromatic hydrocarbon solvents are $C_7$ to $C_{12}$ aromatic hydrocarbons such as toluene, xylene, ethylbenzene, mestylene, etc. Also, suitable examples of alicyclic hydrocarbon solvents are $C_5$ to $C_{12}$ alicyclic hydrocarbons such as cyclopentane, cyclohexane, methyl cyclohexane, etc. The reaction time generally ranges from 0.5 to 5 hours, preferably 2 to 4 hours. Suitable copolymerization techniques which can be used are described in U.S. Pat. No. 3,379,663.

The resin (C) thus obtained generally has the following characteristics:

| (a) | Softening Point | : | about 70 to 150°C (preferably 70 to 120°C) |
| (b) | Bromine Value | : | 3 to 20 |
| (c) | Mean Molecular Weight | : | about 500 to 1,200 |
| (d) | Hue | : | Gardner Value 1 to 5 |
| (e) | Other Properties | : | Volatile Components less than 3% (resulting in a lack of an offensive odor) |

The resin (C) above described is blended with an ethylene-vinyl acetate copolymer (D).

Suitable blending techniques which can be used for blending resin (C) and ethylene-vinyl acetate copolymer (D) are as follows: (a) The resin (C) and the ethylene-vinyl acetate copolymer (D), if desired along with the addition of a wax, a plasticizer, etc., are melted at a temperature ranging from about 120° to 180°C, and then stirred for about 1 to 3 hours while maintaining this temperature. (b) In using a mixer, a kneader or the like, blending can be conducted under the same conditions as described for the melt solution method (a) above. That is, the resin (C) and the copolymer (D) are melted at a temperature ranging from about 120° to 180°C and then blended for about 1 to 3 hours using a mixer, a kneader or the like. However, in using an open mixing roll, the melting is conducted at a temperature ranging from about 100° to 150°C and the blending is accomplished over a period of about 1 to 3 hours.

It is preferred that the vinyl acetate content of the ethylene-vinyl acetate copolymer (D) used in this invention be about 15 to 40% by weight and that the ethylene-vinyl acetate copolymer have a melt index of about 2.5 to 400.

It is also desirable that the mixing ratio (C)/(D), i.e., of the resin component (C) to the ethylene-vinyl acetate component (D) be a ratio ranging from about 20/80 to 70/30, preferably 30/70 to 60/40, by weight.

The hot melt composition of this invention of the aforesaid resin component (C) and the ethylene-vinyl acetate component (D) can be satisfactorily used but to improve the workability of the composition and to prevent a reduction in viscosity it is preferred to add a wax such as a petroleum paraffinic wax (e.g., having a softening point of about 40° to 80°C, preferably 54° to 65°C and a mean molecular weight of about 300 to 800, preferably 360 to 500) or a polyolefin wax (e.g., having a softening point of about 90° to 130°C, preferable 100° to 120°C and a mean molecular weight of about 700 to 4,000) to the melt composition in an amount of about 5 to 50 parts by weight to 100 parts by weight of the total amount of the components (C) and (D). Furthermore, if desired, the hot melt composition of this invention can contain other additives such as a plasticizer, e.g., process oil, polybutene, dioctyl phthalate (DOP) and dibutyl phthalate (DBP), an antioxidant, e.g., 2,6-di-tert-butyl-p-cresol, 2,5-di-tert-butyl-hydroquinone (DBH) and 2,2′-methylene-bis-(4-methyl-6-tert-butyl phenol) (W–400), a stabilizer, etc.

The hot melt composition of this invention can be prepared in the following manner. That is, the ethylene-vinyl acetate copolymer (D) is added to the melt of the resin (C) containing, if desired, additives such as a wax, a plasticizer, etc., followed by stirring under heating to provide a uniform melt and then, if desired, the melt is molded into particles, flakes, pellets, rods, etc., by cooling. Also, the melt can be produced using a mixer, an open mixing roll, and a kneader. At use, the solid composition thus formed is melted again before using as adhesives or coating agents. For example, when the melt product is used as an adhesive, to adhere articles at their corners, a rod-shaped product of the melt can be used in a welding gun and further when the product is for coating, a curtain coater, etc., can be used.

The hot melt composition of this invention has various superior properties such as adhesive property, melt viscosity, odor, color, thermal stability, compatibility with a base resin, flexibility, and tensile strength.

The invention is further explained in greater detail by reference to the following examples. Unless otherwise indicated, all parts, percents, ratios and the like are by weight.

EXAMPLES 1–13 AND COMPARISON EXAMPLES 1–9

Polymerization reactions were conducted in a 1-liter autoclave using the raw materials, the solvents, and the catalysts shown in Table 1 under the reaction temperatures and reaction times also shown in Table 1. After inactivating the catalysts in the reaction products with methanol or an aqueous sodium hydroxide solution and then removing any insoluble matter therefrom by filtration, the reaction products were washed with water until the product became neutral. By further concentrating the reaction products under reduced pressure, the resins were obtained. The yields for and the properties of the resins thus obtained are shown in Table 1 and Table 2.

TABLE 1

|  |  | Raw Material (g) |  | Catalyst (g) | Solvent (g) | Reaction Conditions | Resin Yield (%) |
|---|---|---|---|---|---|---|---|
| Example | 1 | IPT | 70 | AlCl₃ 1.07 | Hexane 200 | −25°C, 3hr | 72 |
|  |  | C₄–C₅ Fraction | 30 |  |  |  |  |
| " | 2 | IPT | 50 | " | " | −30°C, 3hr | 55 |
|  |  | C₄–C₅ Fraction | 50 |  |  |  |  |
| " | 3 | IPT | 30 | " | " | " | 36 |
|  |  | C₄–C₅ Fraction | 70 |  |  |  |  |
| " | 4 | IPT | 30 | BF₃-Phenol Complex 0.78 | Toluene 100 | 0°C, 3hr | 87 |
|  |  | α-MST | 70 |  |  |  |  |
|  |  | C₄–C₅ Fraction | 30 |  |  |  |  |
| " | 5 | IPT | 70 | BF₃-Phenol Complex 0.78 | " | −7°C, 3hr | 89 |
|  |  | α-MST | 30 |  |  |  |  |
|  |  | C₄–C₅ Fraction | 30 |  |  |  |  |
| " | 6 | IPT | 30 | BF₃-Phenol Complex 0.90 | Toluene 150 | −10°C, 3hr | 87 |
|  |  | α-MST | 70 |  |  |  |  |
|  |  | C₄–C₅ Fraction | 50 |  |  |  |  |
| " | 7 | IPT | 70 | BF₃-Phenol Complex 0.90 | " | −5°C, 3hr | 82 |
|  |  | α-MST | 30 |  |  |  |  |
|  |  | C₄–C₅ Fraction | 50 |  |  |  |  |
| " | 8 | IPT | 90 | BF₃Phenol Complex 0.90 | " | −20°C, 3hr | 86 |
|  |  | α-MST | 10 |  |  |  |  |
|  |  | C₄–C₅ Fraction | 50 |  |  |  |  |
| " | 9 | IPT | 70 | BF₃-Phenol Complex 0.90 | " | −10°C, 3hr | 80 |
|  |  | α-MST | 30 |  |  |  |  |
|  |  | C₄–C₅ Fraction | 70 |  |  |  |  |
| " | 10 | IPT | 70 | BF₃-Phenol Complex 0.78 | Toluene 100 | −10°C, 3hr | 92 |
|  |  | VT | 30 |  |  |  |  |
|  |  | C₄–C₅ Fraction | 30 |  |  |  |  |
| " | 11 | IPT | 30 | BF₃-Phenol Complex 0.78 | " | " | 91 |
|  |  | VT | 70 |  |  |  |  |
|  |  | C₄–C₅ Fraction | 30 |  |  |  |  |
| " | 12 | IPT | 45 | BF₃-Phenol Complex 0.78 | Toluene 100 | −2°C, 3hr | 89 |
|  |  | α-MST | 45 |  |  |  |  |
|  |  | VT | 10 |  |  |  |  |
|  |  | C₄–C₅ Fraction | 30 |  |  |  |  |
| " | 13 | IPT | 70 | AlCl₃ 1.07 | Hexane 100 | 20°C, 3hr | 80 |
|  |  | C₅-Fraction | 30 |  |  |  |  |
| Comparative Example | 1 | α-MST | 70 | AlCl₃ 1.47 | Methyl-cyclo-hexane 70 | −10°C, 3hr | 87 |
|  |  | C₄–C₅ Fraction | 30 |  |  |  |  |
| " | 2 | α-MST | 50 | " | Methyl-cyclo-hexane 100 | −20°C, 3hr | 75 |
|  |  | C₄–C₅ Fraction | 50 |  |  |  |  |
| " | 3 | α-MST | 30 | " | " | −30°C, 3hr | 60 |
|  |  | C₄–C₅ Fraction | 70 |  |  |  |  |
| " | 4 | IPT | 50 | BF₃-Phenol Complex 0.69 | Toluene 100 | −5°C, 3hr | 90 |
|  |  | α-MST | 50 |  |  |  |  |
|  |  | C₄–C₅ Fraction | 15 |  |  |  |  |
| " | 5 | IPT | 20 | BF₃-Phenol Complex 0.78 | Mesity-lene 100 | 30°C, 3hr | 88 |
|  |  | VT | 55 |  |  |  |  |
|  |  | ST | 18 |  |  |  |  |
|  |  | α-MST | 7 |  |  |  |  |
|  |  | C₄–C₅ Fraction | 30 |  |  |  |  |
| " | 6 | VT | 70 | AlCl₃ 1.07 | Hexane 200 | −20°C, 3hr | 84 |
|  |  | C₄–C₅ Fraction | 30 |  |  |  |  |
| " | 7 | St | 70 | BF₃-Phenol Complex 0.60 | Toluene 100 | −10°C, 3hr | 97 |
|  |  | C₄–C₅ Fraction | 30 |  |  |  |  |
| " | 8 | Rosin Ester, EG-H* (trade name, produced by Tokushima Seiyu K.K.) | | | | | |
| " | 9 | Petroleum Resin, Plas Tac** (trade name, produced by Mitsui Petrochemical Industries, Ltd.) | | | | | |

*ester gum, the glycerin ester of rosin
**polymerized petroleum fraction resin
(Note):
IPT: Isopropenyltoluene comprising 5% o-IPT, 60% m-IPT, and 35% p-IPT.
α-MST: α-Methylstyrene
VT : Vinyltoluene
ST : Styrene The composition of the C₄–C₅ fraction was as follows:

| | |
|---|---|
| 1-Butene | 10.6% |
| 2-Butene | 9.6% |
| Isobutene | 15.3% |
| 1,3-Butadiene | 18.3% |
| 1-Pentene | 2.6% |
| 2-Pentene | 3.2% |
| Cyclopentene | 2.1% |
| 1,3-Pentadiene | 3.0% |
| Isoprene | 6.3% |
| Cyclopentadiene | 4.7% |
| 2-Methyl-1-Butene | 3.7% |
| 2-Methyl-2-Butene | 2.1% |
| Saturated Hydrocarbons | 18.5% |

The composition of the C₅ fraction was as follows:

| | |
|---|---|
| 1-Pentene | 4.8% |
| 1,3-Pentadiene | 9.1% |
| 2-Methyl-1-Butene | 7.2% |
| Cyclopentadiene | 9.3% |
| 2-Pentene | 4.9% |
| 3-Methyl-1-Butene and Isopentane | 12.0% |
| 2-Methyl-2-Butene | 3.5% |
| Isoprene | 14.7% |
| Others | 34.5% |

TABLE 2

|  |  | Resin Property | | | |
|---|---|---|---|---|---|
|  |  | Softening Point (°C) | Hue (Gardner) | Molecular Weight | Bromine Value |
| Example | 1 | 98 | less than 1 | 760 | 10 |
| " | 2 | 101 | " | 870 | 14 |
| " | 3 | 91 | 2 | 870 | 22 |
| " | 4 | 95 | 3 | 770 | 13 |
| " | 5 | 97 | 3 | 750 | 11 |
| " | 6 | 91 | 2–3 | 710 | 18 |
| " | 7 | 92 | 3–4 | 750 | 13 |
| " | 8 | 103 | 3 | 850 | 12 |
| " | 9 | 108 | 1 | 870 | 15 |
| " | 10 | 90 | 2–3 | 770 | 16 |
| " | 11 | 98 | 3 | 780 | 14 |
| " | 12 | 95 | 2–3 | 800 | 12 |
| " | 13 | 98 | 4 | 750 | 8 |
| Comparative Example | 1 | 103 | 1–2 | 930 | 11 |
| " | 2 | 107 | 1 | 1290 | 18 |
| " | 3 | 93 | 3 | 1490 | 21 |
| " | 4 | 90 | 3 | 720 | 12 |
| " | 5 | 101 | 2–3 | 770 | 13 |
| " | 6 | 93 | 2 | 1200 | 13 |
| " | 7 | 87 | 2–3 | 1150 | 13 |
| " | 8 | 80 | 9 | 730 | 52 |
| " | 9 | 99 | 10 | 820 | 34 |

A mixture of 160g of each of the resins prepared in the above-described examples and comparative examples, 160g of Evaflex No. 220 (trade name of an ethylene-vinyl acetate copolymer containing 28% by weight vinyl acetate and having a melt index of 150, made by Mitsui Polychemical Co.), and 80g of a paraffin wax (140°F) was melted by heating and stirred for 2 hours in a stainless steel beaker in an oil bath of 160°C to provide a hot melt composition. The properties of the hot melt composition thus prepared were measured in the following manner and the results obtained are shown in Table 3.

1. Adhesive Strength: The hot melt composition was coated in a thickness of 20 microns on an aluminum foil having a width of 25mm and a thickness of 50 microns and also having a mirror-like surface using an automatic applicator. After the coated layers on the aluminum foils thus prepared were sealed together using a seal width of 15mm, a sealing temperature of 140°C, a sealing pressure of 1kg/cm², and a sealing time of 2 seconds employing a heat sealer, the peeling strength was measured at a tension speed of 300mm/min. by means of an Instron tension tester.

2. Hue: The hue of the hot melt composition melted by heating (160°C) was shown by a Gardner value.

3. Compatibility: The transparency of the hot melt composition melted by heating (160°C) was evaluated by the naked eye and samples of good transparency to completely opaque due to the formation of a white turbidity were classified into five grades of A, B, C, D, and E with A being the best grade and E being the poorest.

4. Cloud Point: According to JIS K 2266.

5. Odor: Samples of weak odor to strong stimulative odor at heating to 160°C were evaluated using the grades of A, B, C and D with D being the most offensive in odor.

6. Melt Viscosity: The viscosity of the sample at 140°C was measured using a Brookfield viscometer.

7. Flexibility: A sheet of the hot melt composition having a thickness of 2mm, a width of 15mm and a length of 100mm was bent with a bending tester (at a temperature of 25°C), a tensile force of 1.8kg/cm², and a bending of 80° and the number of times the sheet could be bent until the sheet was broken was measured. A sample which could be bent more than 5,000 times was classified as A, the sample which could be bent 1,000 to 4,999 times as B, and a sample which could be bent less than 1,000 times as C.

8. Thermal Stability: After the sample was heated to 200°C for 100 hours, the change of hue, the presence of carbonization (gellation), the presence of phase separation, the change of viscosity, and the change of adhesive strength were measured. These results were classified into the three grades of A, B and C as the entire evaluation. That is, a grade of A showed that the changes were low and a grade of C showed that the changes were severe and the sample was unsuitable for practical use.

TABLE 3

|  |  | Compatibility | Cloud Point (°C) | Odor | Viscosity [CP] (at 140°C) | Flexibility (25°C) | Thermal Stability | Adhesive Strength (g/25mm) | Hue (Gardner) |
|---|---|---|---|---|---|---|---|---|---|
| Example | 1 | A | 60 | A | 4700 | A | A | 1040 | 1–2 |
| " | 2 | A | 63 | A | 4900 | A | A | 870 | 3 |
| " | 3 | A-B | 62 | A-B | 6000 | A | A | 1200 | 3 |
| " | 4 | A | 124 | A-B | 5100 | A | A | 600 | 2 |
| " | 5 | A | 68 | A | 4900 | A | A | 930 | 2 |
| " | 6 | A | 122 | A | 5000 | B | A | 870 | 2–3 |
| " | 7 | A | 63 | A | 4800 | A | A | 1170 | 3 |
| " | 8 | A | 101 | A | 5400 | A | A | 840 | 2–3 |
| " | 9 | B | 65 | A | 4200 | A | A | 1070 | 2 |
| " | 10 | A | 65 | A | 4700 | A | A | 950 | 3–4 |
| " | 11 | A | 137 | A | 4900 | A | A-B | 490 | 3 |
| " | 12 | A | 68 | A-B | 4500 | A | A-B | 990 | 3 |
| " | 13 | A-B | 70 | A | 4800 | A | A | 850 | 4 |

TABLE 3 — Continued

| | Compatibility | Cloud Point (°C) | Odor | Viscosity [CP] (at 140°C) | Flexibility (25°C) | Thermal Stability | Adhesive Strength (g/25mm) | Hue (Gardner) |
|---|---|---|---|---|---|---|---|---|
| Comparative Example | 1 | D | more than 190 | A-B | 6200 | C | C (Phase Separation) | 1090 | 2-4 |
| " | 2 | C-D | " | A | 7300 | C | C ( " ) | 780 | 3-4 |
| " | 3 | C-D | " | A-B | 6000 | C | C ( " ) | 1130 | 4-6 |
| " | 4 | B | 160 | A | 6000 | A | B | 320 | 4-6 |
| " | 5 | B | 168 | A-B | 6500 | B | B | 1070 | 4-6 |
| " | 6 | B | 168 | B | 5500 | C | C (Phase Separation) | 1010 | 2-4 |
| " | 7 | D-E | 168 | A-B | 8800 | C | C ( " ) | 800 | 4-5 |
| " | 8 | A | 64 | B | 4000 | A | B | 1300 | 10 |
| " | 9 | A | 64 | C | 4700 | A | B | 1150 | 11 |

While the invention has been described in detail and with reference to specific embodiments thereof, it will be apparent to one skilled in the art that various changes and modifications can be made therein without departing from the spirit and scope thereof.

What is claimed is:

1. A hot melt composition comprising a mixture of a resin (C) and an ethylene-vinyl acetate copolymer (D) containing about 15 to 40% by weight vinyl acetate, said resin (C) comprising the copolymerization product of 100 parts by weight of vinyl aromatic hydrocarbons (i) containing more than 25% by weight isopropenyltoluene and about 5 to 250 parts by weight of a by-product hydrocarbon fraction (ii) obtained in refining or cracking petroleum and having a boiling point ranging from about −15°C to 45°C and 4 to 5 carbon atoms, the content of said isopropenyltoluene in the sum of said vinyl aromatic hydrocarbons (i) and said by-product fraction (ii) being more than about 20% by weight, obtained in the presence of a Friedel-Crafts catalyst the weight ratio of said resin (C) to said ethylene-vinyl acetate copolymer ranging from about 20/80 to 70/30.

2. The hot melt composition as claimed in claim 1, wherein said vinyl aromatic hydrocarbons (i) comprise (a) more than about 25% by weight isopropenyltoluene, (b) more than about 15% by weight α-methylstyrene, and (c) other vinylic aromatic hydrocarbons having 8 to 12 carbon atoms.

3. The hot melt composition as claimed in claim 1, wherein said vinyl aromatic hydrocarbons (i) comprise (a) about 25 to 100% by weight isopropenyltoluene and (b) about 0 to 75% by weight vinylic aromatic hydrocarbons having 8 to 12 carbon atoms.

4. The hot melt composition as claimed in claim 1, wherein said vinyl aromatic hydrocarbons (i) comprise (a) about 80 to 100% by weight isopropenyltoluene and (b) about 0 to 20% by weight vinylic aromatic hydrocarbons having 8 to 12 carbon atoms.

5. The hot melt composition as claimed in claim 1, wherein said by-product fraction (ii) is a fraction mainly comprising unsaturated hydrocarbons having a boiling point ranging from about 30° to 45°C and having 5 carbon atoms.

6. The hot melt composition as claimed in claim 1, wherein said resin (C) mainly comprises unsaturated hydrocarbons having a boiling point ranging from about −15° to 15°C and having 4 carbon atoms.

7. The hot melt composition as claimed in claim 1, wherein said Friedel-Crafts catalyst is selected from the group consisting of aluminum trichloride, aluminum tribromide, monoethyldichloro aluminum, titanium tetrachloride, tin tetrachloride, ferric chloride, boron trifluoride, and a complex compound of boron trifluoride.

8. The hot melt composition as claimed in claim 7, wherein said complex compound is a complex compound of boron trifluoride and phenol.

9. The hot melt composition as claimed in claim 1, wherein the copolymerization product of said vinyl aromatic hydroxarbons (i) and said by-product fraction (ii) is obtained in the presence of a hydrocarbon solvent.

10. The hot melt composition as claimed in claim 9, wherein said hydrocarbon solvent is a $C_5$ to $C_{16}$ aliphatic hydrocarbon, a $C_7$ to $C_{12}$ aromatic hydrocarbon or a $C_5$ to $C_{12}$ alicyclic hydrocarbon.

11. The hot melt composition as claimed in claim 1, wherein the copolymerization product of said vinyl aromatic hydrocarbons (i) and said by-product fraction (ii) is obtained at temperatures of about −50° to 80°C.

12. The hot melt composition as claimed in claim 1, wherein the proportion of said by-product fraction (ii) to said vinyl aromatic hydrocarbons (i) is 30 to 100 parts by weight to 100 parts by weight of said vinyl aromatic hydrocarbons (i).

13. The hot melt composition as claimed in claim 1, wherein said composition includes about 5 to 50 parts by weight of a wax per 100 parts by weight of the total amount of said components resin (C) and said ethylene-vinyl acetate copolymer (D).

14. The hot melt composition as claimed in claim 13, wherein said wax is a petroleum paraffin wax or a polyolefin wax.

* * * * *